US007770213B2

(12) United States Patent
Perlman et al.

(10) Patent No.: US 7,770,213 B2
(45) Date of Patent: Aug. 3, 2010

(54) METHOD AND APPARATUS FOR SECURELY FORGETTING SECRETS

(75) Inventors: Radia J. Perlman, Samamish, WA (US); Anton B. Rang, Houlton, WI (US)

(73) Assignee: Oracle America, Inc., Redwood Shores, CA (US)

( * ) Notice: Subject to any disclaimer, the term of this patent is extended or adjusted under 35 U.S.C. 154(b) by 1002 days.

(21) Appl. No.: 11/405,980

(22) Filed: Apr. 17, 2006

(65) Prior Publication Data

US 2007/0245410 A1 Oct. 18, 2007

(51) Int. Cl.
*G06F 17/30* (2006.01)
(52) U.S. Cl. .......................................................... 726/6
(58) Field of Classification Search ........................ None
See application file for complete search history.

(56) References Cited

U.S. PATENT DOCUMENTS 6,134,660 A 10/2000 Boneh

2004/0139024 A1* 7/2004 So .............................. 705/51
2005/0238175 A1* 10/2005 Plotkin et al. ................ 380/281
2007/0038857 A1* 2/2007 Gosnell ....................... 713/165

OTHER PUBLICATIONS

Publication: "A Revocable Backup System", Dan Boneh and Richard Lipton, Princeton University. Princeton, New Jersey, Proceedings of the Sixth USENIX UNIX Security Symposium, San Jose, CA Jul. 1996, www.usenix.org/publications/library/proceedings/sec96/full_papers/boneh/boneh.ps.

* cited by examiner

*Primary Examiner*—Brandon S Hoffman
(74) *Attorney, Agent, or Firm*—Park, Vaughan & Fleming LLP (57) ABSTRACT

One embodiment of the present invention provides a system that facilitates securely forgetting a secret. During operation, the system obtains a set of secrets which are encrypted with a secret key $S_i$, wherein the set of secrets includes a secret to be forgotten and other secrets which are to be remembered. Next, the system decrypts the secrets to be remembered using $S_i$, and also removes the secret to be forgotten from the set of secrets. The system then obtains a new secret key $S_{i+1}$, and encrypts the secrets to be remembered using $S_{i+1}$. Finally, the system forgets $S_i$.

21 Claims, 4 Drawing Sheets

METHOD AND APPARATUS FOR SECURELY FORGETTING SECRETS

BACKGROUND

1. Field of the Invention

The present invention relates to techniques for encrypting and decrypting data. More specifically, the present invention relates to a method and an apparatus for encrypting data and managing keys to facilitate securely forgetting secrets.

2. Related Art

To ensure data is not lost prematurely, it is common to create multiple backup copies of the data. However, it is also desirable in some cases to ensure that data, once deleted, is not recoverable. This can be a rather complicated task if backup copies of the data are created and stored at different locations.

This problem can be solved by only storing the data in encrypted form. In this way, destroying the data is reduced to the somewhat easier problem of deleting the key that is required to decrypt. However, long-term user keys can, over time, be obtained by an adversary through compromise or coercion. To remedy this problem, it is possible for keys to be kept in tamper-resistant smart cards, in which case it is not feasible to covertly discover the keys.

Unfortunately, smart cards have limited storage space, which makes it impractical to store a large number of keys on a smart card. This restriction significantly limits the capabilities of a system that uses a smart card to manage keys. In particular, this restriction makes it hard to securely delete data items "on-demand."

To securely delete a given data item on-demand, it is desirable to encrypt the given data item so that it can only be decrypted with a data-item-specific key, wherein this data-item-specific key can only be used to decrypt the given data item, and cannot be used to decrypt other data items. In this way, deleting the data-item-specific key only makes the given data item unreadable, and does not affect other data items, which can be decrypted with other keys. However, it is not possible to store a large number of data-item-specific keys on a smart card.

Hence, what is needed is a method and an apparatus that facilitates making data unreadable "on-demand," and also provides the protection of a smart card for the keys.

SUMMARY

One embodiment of the present invention provides a system that facilitates securely forgetting a secret. During operation, the system obtains a set of secrets which are encrypted with a secret key $S_i$, wherein the set of secrets includes a secret to be forgotten and other secrets which are to be remembered. Next, the system decrypts the secrets to be remembered using $S_i$, and also removes the secret to be forgotten from the set of secrets. The system then obtains a new secret key $S_{i+1}$, and encrypts the secrets to be remembered using $S_{i+1}$. Finally, the system forgets $S_i$.

In a variation on this embodiment, the set of secrets is divided into subsets which are encrypted with different subset keys, and each subset key $K_{j,k}$ is encrypted either directly or indirectly using $S_i$ prior to being stored. In this variation, decrypting the secrets to be remembered involves decrypting secrets to be remembered within a target subset containing the secret to be forgotten. This involves using $S_i$ to either directly or indirectly to decrypt a subset key $K_{j,k}$ for the target subset, and then decrypting the secrets to be remembered using $K_{j,k}$. In this variation, obtaining the new secret key $S_{i+1}$ also involves obtaining a new subset key $K_{j,k+1}$ for the target subset. Furthermore, encrypting the secrets to be remembered involves, encrypting the secrets to be remembered in the target subset using $K_{j,k+1}$, and then using $S_{i+1}$ either directly or indirectly to encrypt $K_{j,k+1}$.

In a further variation, the subsets of the set of secrets and the corresponding subset keys are stored in a lookup structure, which facilitates looking up the secrets.

In a further variation, the lookup structure is a tree, wherein the subsets are stored in corresponding nodes which form the tree, wherein each parent node in the tree contains keys which are used to encrypt associated child nodes in the tree, and wherein the secret key $S_i$ is used to encrypt the root node of the tree.

In a further variation, the system retrieves a desired secret by first performing a lookup in the tree to obtain a target node containing the desired secret, and also to obtain a corresponding key $K_{j,k}$ for the target node. This lookup involves using $S_i$ to decrypt the root node of the tree, and thereafter using keys contained in parent nodes to decrypt child nodes as the lookup progresses from the parent nodes to the child nodes. Next, the system uses $K_{j,k}$ to decrypt the desired secret contained in the target node.

In a further variation, the system stores a new secret by first performing a lookup in the tree to identify a target node in which to store the new secret, and also to obtain a corresponding key $K_{j,k}$ for the target node. This lookup involves using $S_i$ to decrypt the root node of the tree, and thereafter using keys contained in parent nodes to decrypt child nodes as the lookup progresses from the parent nodes to the child nodes. Next, the system uses $K_{j,k}$ to encrypt the new secret, and then inserts the encrypted new secret into the subset of secrets contained in the target node.

In a variation on this embodiment, the set of secrets is maintained on a general-purpose computer which communicates with a smart card, wherein the encryption and decryption operations are performed on the smart card. In this variation, all secret keys, including the secret key $S_i$ and the new secret key $S_{i+1}$, are stored only on the smart card and never leave the smart card.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Securely Forgetting Secrets

The present invention provides a technique for storing secret data in such a way that the secret data can be securely destroyed, even if backup copies are maintained as protection against hardware failure. We refer to a secret that can be forgotten as a "forgettable secret." An arbitrary number of forgettable secrets may be maintained, and independently destroyed at different times, while storing only a small fixed number of protected keys (which are neither backed up nor accessible to applications). Note that reducing the number of keys which must be protected for an application is highly desirable because protected storage is an expensive component within computer systems.

One embodiment of the present invention facilitates the secure deletion of files from a file system. These files can be encrypted with a unique key, which is treated as a forgettable secret. To delete a file, its key is forgotten. If all file system backups are also stored in encrypted form, then forgetting the key ensures that the unencrypted file data is not recoverable from the file system or from any backup.

System

Figure 1:
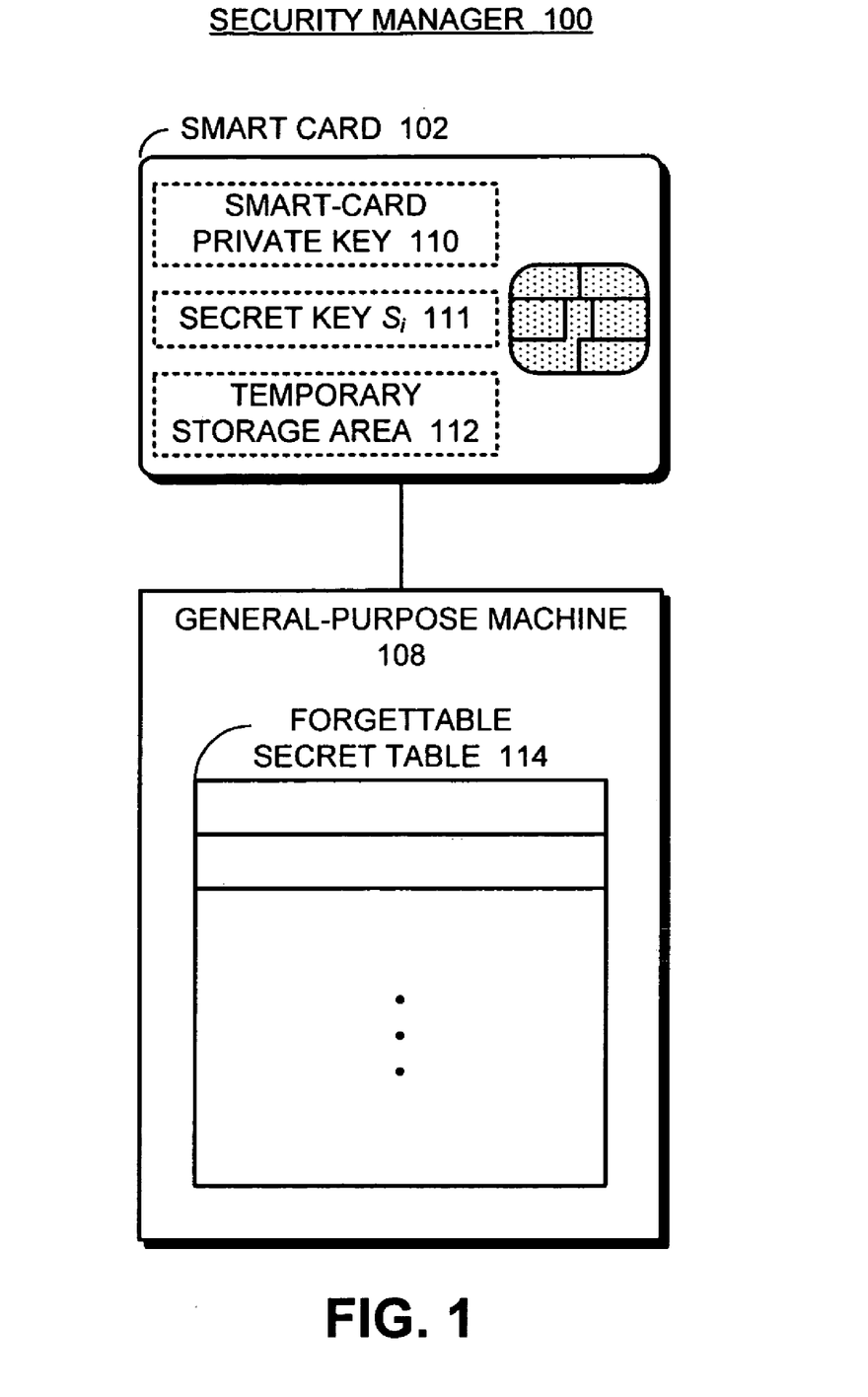
FIG. 1 illustrates a system including a smart card in accordance with an embodiment of the present invention.

FIG. 1 illustrates a secret manager 100, which includes a smart card 102 and a general-purpose machine 108 in accordance with an embodiment of the present invention. Smart card 102 can include any type of tamper-resistant computational device which is capable of performing cryptographic operations and storing keys. However, note that the present invention is not limited to systems that use smart cards. In general, the present invention can be applied to any type of computational device which protects data by encrypting it.

Smart card 102 maintains a smart card private key 110, which belongs to smart card 102. Smart card 102 also maintains a secret key $S_i$ which can be used to decrypt secrets as is described in more detail below. Note that $S_i$ is only used by smart card 102, and is never made available to other components of the system. As described below, $S_i$ is one key in a sequence of keys. In some cases, smart card 102 may hold several earlier keys from this sequence ($S_i$, $S_{i-1}$, . . . $S_{i-n}$). Smart card 102 additionally contains a temporary storage area 112, which can be used to store various keys and data items.

General-purpose machine 108 can include any type of computer system, including, but not limited to, a computer system based on a microprocessor, a mainframe computer, a digital signal processor, a portable computing device, a personal organizer, a device controller, and a computational engine within an appliance. General-purpose machine 108 includes data storage capabilities and computational components, and may also include networking capabilities.

As illustrated in FIG. 1, general-purpose machine 108 contains forgettable secret table 114, which contains a set of encrypted secrets. During operation, general-purpose machine 108 causes smart card 102 to use secret key $S_i$ to perform various operations involving secrets contained within forgettable secret table 114. While performing these operations, secret key $S_i$ and other decrypted keys are stored and used within smart card 102, but never leave smart card 102. This process is described in more detail below.

Notation

We first define some notation.

1. The terms $E_x$ and $D_x$ represent a public key and a private key, respectively, of a public-key pair.

2. The notation $\{X\}_y$ represents an item X which is encrypted with a key y.

3. The notation <X, Y, Z> represents a group of related items.

Forgettable Secret Table

As mentioned above, in one embodiment of the present invention, general-purpose machine 108 contains forgettable secret table (FST) 114, which contains a number of forgettable secrets.

In one embodiment of the present invention, each entry in FST 114 includes: (1) the name of the secret—which is used to identify the secret; (2) the value of the secret, encrypted with a key as described below; and optionally (3) policy or authentication information governing use of the secret. Note that the value of the secret can itself be a secret key, or can be a public-key pair. In the latter case, only the private portion of the key needs to be encrypted.

Figure 2:
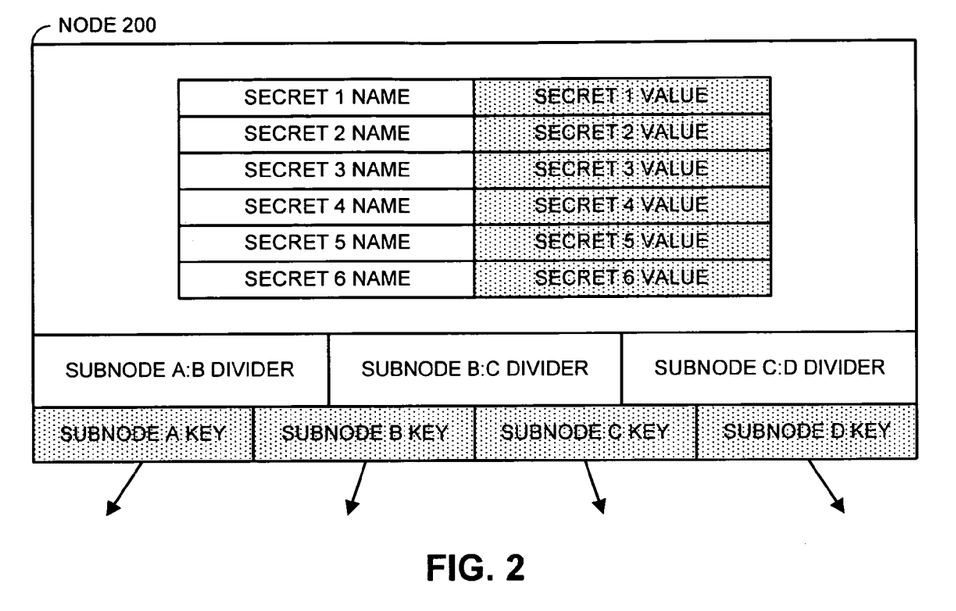
FIG. 2 illustrates a tree node in accordance with an embodiment of the present invention.

In one embodiment of the present invention, FST 114 is structured as a tree comprised of nodes containing pointers to other nodes. Each node in this tree contains some encrypted fields and some unencrypted fields. A single key, which is referred to as the "node-key," is used to decrypt all of the encrypted fields in a node. The node-key is stored in the "parent" of the node in the tree. For the root of the tree, which has no parent, $S_i$ is used as the decryption key. Each node in the tree may contain forgettable secret entries, pointers to other tree nodes, or both. The values of secrets within a tree node are encrypted using the node's key. The names of secrets and any policy information may also be encrypted, but need not be.

Each pointer to a tree node is associated with a set of secrets, and is stored together with the key used to encrypt fields within the node to which it points. One method for defining this set of secrets is to order all secrets by their names, and to use "divider" names to divide all secrets stored within a node's subtree into ranges, such that each secret whose name falls within a particular range is stored in a particular node (or in one of its children). This creates a B-tree of secrets, but with the addition of per-node encryption keys. Note that all possible B-trees, including B+-trees and B*-trees, or a pure binary tree, can be used.

For example, FIG. 2 illustrates the structure of a tree node. The shaded fields are encrypted using the node's key. The other fields may or not may be encrypted, depending on performance and secrecy needs. (For instance, if secret names should not be readable, the names and dividers may be encrypted.) The root node of the FST tree is encrypted with $S_i$. Note that the FST can be freely backed up with no additional encryption. Also note that the "i-th" updated version of the FST is referred to as "$FST_i$."

Operations

In one embodiment of the present invention, a number of operations can be performed on the FST tree, including: (1) creating a new secret; (2) retrieving a secret; and (3) forgetting a secret.

Creating and Storing New Secret

Figure 3:
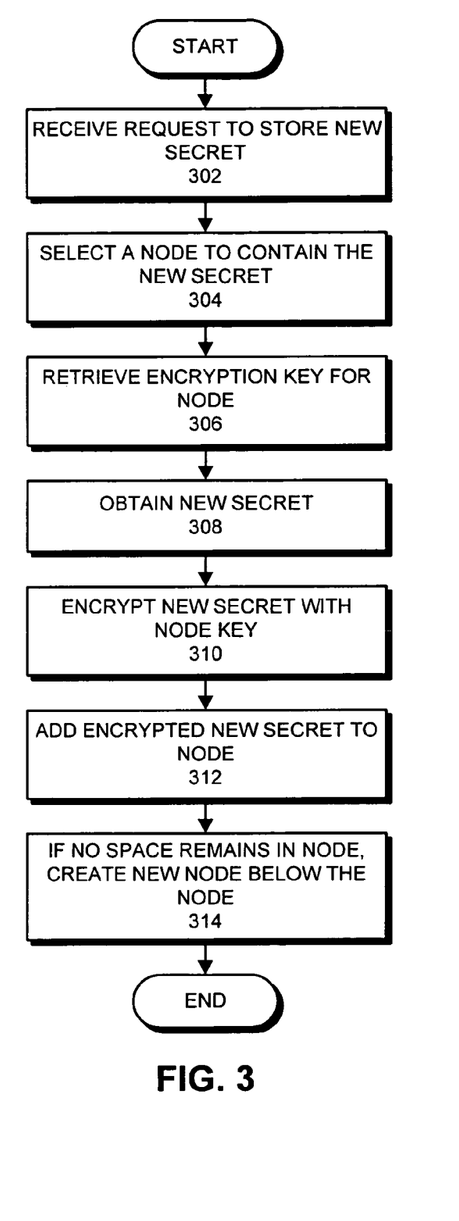
FIG. 3 presents a flow chart illustrating the process of creating and storing a new secret in accordance with an embodiment of the present invention.

FIG. 3 presents a flow chart illustrating the process of creating and storing a new secret in accordance with an embodiment of the present invention. First, the system receives a request to store a new secret (step 302). This request can include the name of the new secret along with any additional information which may be needed, such as a desired key type, a desired key size or ownership information. The system then performs the following operations.

First, the system selects a node within the FST to contain the new secret (step 304). This can be done using a tree-traversal algorithm based on the name of the secret.

Next, the system retrieves the encryption/decryption key for the node (step 306), which is referred to as the "node-key." This node-key is stored in the parent node of the node, and must be decrypted with the parent node's node-key. This process is repeated recursively until the root node has been decrypted using $S_i$.

The system then obtains the new secret (step 308). In the example above, this involves generating a new key-pair, $E_{secret}/D_{secret}$, wherein $E_{secret}$ is a public key and $D_{secret}$ is the corresponding private key. Alternatively, the secret can be any other type of data item that needs to be stored securely.

Next, the system encrypts the new secret with the node-key for the selected node (step 310). For example, this can involve producing $\{D_{secret}\}_{node-key}$.

Finally, the system adds the encrypted new secret to the node (step 312). For example, this can involve adding the entry <secret-name, $E_{secret}$, $\{D_{secret}\}_{node-key}$> to the node. (Note that $E_{secret}$ may be omitted if it is sent to the system which requested the new secret.)

Next, if no more space remains in the node, the system can use any known "tree-splitting" technique to create a new node below the node in the tree (step 314). Next, if the new secret is a key pair, the system can send the newly created public key, $E_{secret}$, to the requesting system.

Retrieving a Secret

Figure 4:
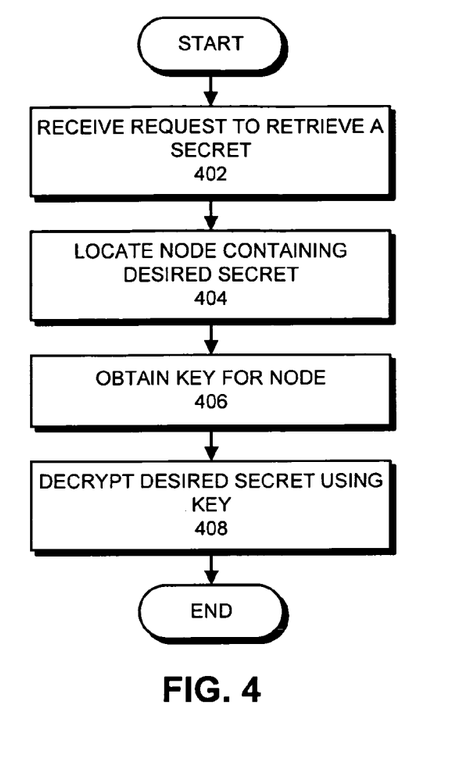
FIG. 4 presents a flow chart illustrating the process of retrieving a secret in accordance with another embodiment of the present invention.

FIG. 4 presents a flow chart illustrating the process of retrieving a secret in accordance with another embodiment of the present invention. First, the system receives request to retrieve a desired secret, which includes the name of the desired secret (step 402). The request may also include text which has been encrypted with the secret, which allows the system to decrypt the text without exposing the secret itself.

In response to receiving the request, the system first locates the node within the FST containing the named secret (step 404). This can involve using the secret name to perform a lookup into the FST tree to locate the node which contains the named secret.

The system also obtains the node-key for the located node (step 406). This can involve performing a recursive operation starting from the root of the tree (which is itself encrypted with $S_i$).

Next, the system uses the node-key to decrypt the secret in the located node (step 408). In the example above where the secret is a private key $D_{secret}$, if a text is supplied with the request, the system uses the decrypted private key $D_{secret}$ to decrypt the text. The system then provides either $D_{secret}$ or the decrypted text to the requesting system. Note that it is undesirable for the requesting system to store either $D_{secret}$ or the decrypted text (which may be a key) on permanent storage, because doing so would defeat the purpose of enabling $D_{secret}$ to be securely forgotten.

In some cases, if the secret must never be exposed to the requesting system, the system could itself perform an operation involving the secret. For example, the system can use the secret to: perform a decryption operation; to perform an encryption operation; or to digitally sign a piece of data.

For example, the system might hold a key used to sign a document proving that it was produced by a particular person during a particular time period. If that person is no longer authorized to sign documents, or if the time period expires, the secret key should be forgotten. In this example, the person should not be allowed to retain a copy of the secret key, hence the system should not expose the secret key, and should instead perform the encryption or signing itself.

Forgetting of a Secret

The destruction of a secret makes all data encrypted with that secret inaccessible, but only if no other copies of the secret exist. In many cases, it is necessary to keep multiple copies of a secret for reliability purposes. For instance, an encrypted file system must be backed up to avoid loss of data if hardware fails.

Removing a secret from the FST is not sufficient to destroy it, because other copies of the FST may exist. Since the FST is stored on a general-purpose computer (and may be quite large), it is important that it be backed up. These backup copies contain secrets, albeit in encrypted form.

No secret can be retrieved from the FST without knowledge of $S_i$. This is clear because the encryption key for each node within the FST is encrypted through a chain of keys whose first entry is $S_i$. If we destroy $S_i$, no secrets within the specific updated version $FST_i$ of FST can be retrieved.

To destroy a secret in the FST, we can: (1) remove the secret from the FST, (2) generate a new key $S_{i+1}$, (3) re-encrypt the FST with $S_{i+1}$, and (4) destroy $S_i$. However, re-encrypting the entire FST has a substantial cost. Fortunately, we can take advantage of the tree structure of the FST to reduce this cost substantially—to a cost which grows logarithmically, rather than linearly, in the number of secrets in the table.

Figure 5:
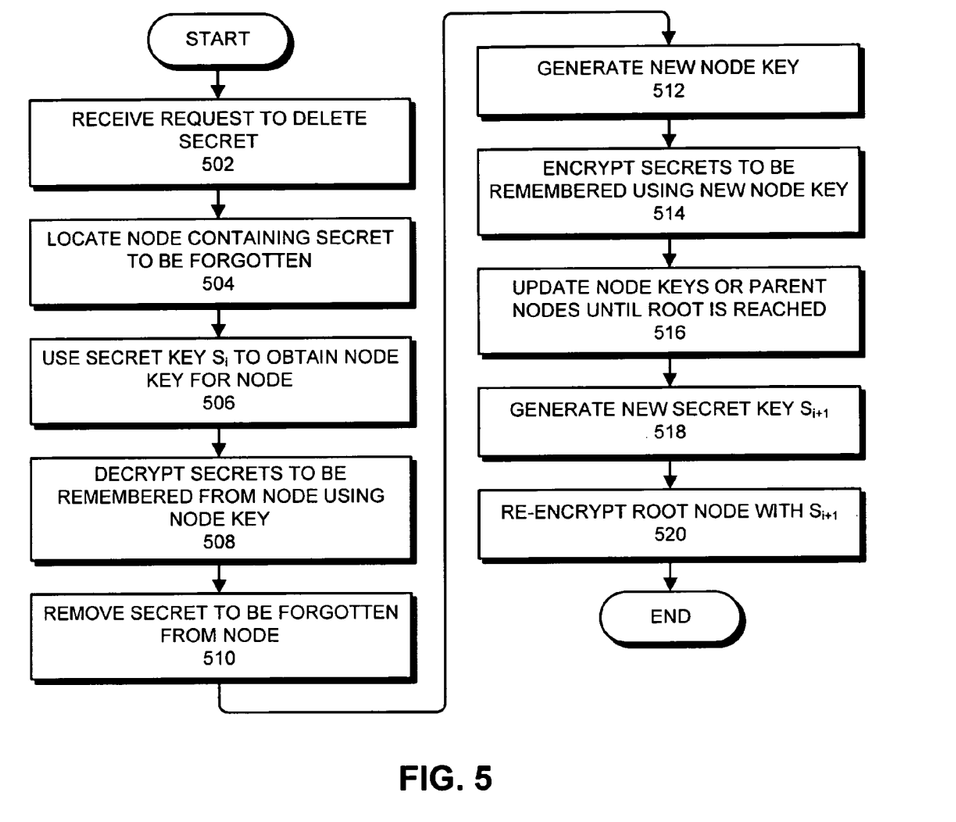
FIG. 5 presents a flow chart illustrating the process of forgetting a secret in accordance with another embodiment of the present invention.

FIG. 5 presents a flow chart illustrating the process of forgetting a secret in accordance with another embodiment of the present invention. During the process of forgetting a secret, the system first receives a request to delete a secret, wherein the request includes the name of the secret (step 502).

In response to the request, the system locates the node within the FST containing the named secret (step 504). This can involve using the secret name to perform a lookup into the FST tree to locate the node which contains the secret.

The system also obtains the node-key for the located node (step 506). This can involve performing a recursive operation starting from the root of the tree (which is itself encrypted with $S_i$) to obtain the secret.

Next, the system removes the secret to be forgotten from the node (step 510). The system then generates (or otherwise obtains) a new node-key (step 514). The system then encrypts the remaining secrets in the node using the new node-key (step 516). This new node-key is then used to replace an existing node-key for the node, which is located in the parent of the node.

The system then proceeds towards the root of the tree, starting with the parent node, generating a new key for each node the system encounters and updating its parent. Upon reaching the root of the tree, the system generates (or otherwise obtains) a new secret key $S_{i+1}$ (step 518) and re-encrypts the root node of the tree with $S_{i+1}$ (step 520). This completes the process of generating $FST_{i+1}$.

$S_{i+1}$ can subsequently be used to retrieve all of the secrets in $FST_{i+1}$ except for the one which was just removed. As soon as we destroy $S_i$, the secret which was just removed becomes unretrievable, even from backups of $FST_i$, and can be considered destroyed. In practice, $S_i$ should not be destroyed until sufficient copies of $FST_{i+1}$ have been made to ensure that $FST_{i+1}$ will not be lost due to a failure. Until that time, both $S_i$ and $S_{i+1}$ should be stored in the smart card. If more secrets must be forgotten before sufficient copies of $FST_{i+1}$ exist, we may keep $S_i$ as long as needed, storing both $S_i$ and $S_{i+n}$ in the smart card (and during re-encryption, $S_i$, $S_{i+n}$, and $S_{i+n+1}$).

Variations

One-Way Hash or Encryption to Generate STK Sequence

We can eliminate the need to store multiple secrets $S_i$, $S_{i+1}$, ..., by using each key to generate its successor. For instance, the system could use a one-way hash function h and generate $S_{i+1}$ as $h(S_i)$. In this case, only the oldest $S_i$ for which sufficient copies of $FST_i$ exist need be kept in the key store. When sufficient copies of $FST_{i+n}$ exist, $S_i$ can be replaced by $S_{i+n}$ in the key store. Since the hash function is one-way, there is no way to recover $S_i$ once it has been replaced, ensuring that previously forgotten secrets cannot be recovered.

K-Out-of-N Distribution

The secret manager presents a single point of failure for a system using it. If the security manager is untrustworthy, an attempt to forget a secret may not actually result in the secret being forgotten. Worse, if the security manager itself is lost, any secrets which the security manager maintained cannot be retrieved.

The solution to both of these problems is to distribute the secret key, $S_{class}$, among multiple secret managers. The secret key $S_{class}$ can be divided using a K-out-of-N scheme, in which K independent agents must cooperate to retrieve the key. In this case, at least K secret managers must fail to forget their portions of the secret before the key is not destroyed; or at least N−K+1 secret managers must be lost before the key becomes irretrievable. For instance, with a 2-out-of-3 scheme, the loss or misbehavior of any one security manager will not affect the correct overall behavior of the system.

Recoverability Policy

In some applications, it is desirable to be able to "reverse" the destruction of a secret. For instance, a security officer may be allowed to view data which has otherwise been securely forgotten.

Such a policy can be implemented within the smart card. The solution to the problem of proving one's authority to the smart card is not described here, but could be done using any of several existing techniques, which generally rely on keys within the smart card.

To implement this modification to the technique, when $FST_{i+1}$ is produced from $FST_i$, the entry for the class being destroyed is not removed from the table. Rather, it is re-encrypted as are the other classes, but with some additional information attached. At a minimum, this additional information includes the fact that it has been deleted; it may also include the policy stating who would be allowed to view that data. (This policy should ideally be protected from modification; for instance, the entire table entry could be certified with the smart card's permanent key.)

If an attempt is made to retrieve the secret for this table entry, the smart card will require that the request be accompanied by proof that the requester is authorized to retrieve the key for that entry. The smart card will refuse to decrypt the secret unless such proof is provided and the request is consistent with the policy.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for securely forgetting a secret, comprising:
    obtaining a set of secrets which are encrypted with a secret key $S_i$, wherein the set of secrets includes a secret to be forgotten and other secrets which are to be remembered, wherein each secret comprises a unique key that is used to encrypt and decrypt one or more associated files;
    decrypting the secrets to be remembered using $S_i$, wherein decrypting the secrets includes using Si to decrypt all of the secrets;
    removing the secret to be forgotten from the set of secrets;
    obtaining a new secret key $S_{i+1}$;
    encrypting the secrets to be remembered using $S_{i+1}$; and
    forgetting $S_i$, wherein forgetting $S_i$ involves making all copies of the secret to be forgotten permanently unretrievable.

2. The method of claim 1,
    wherein the set of secrets is divided into subsets which are encrypted with different subset keys;
    wherein each subset key $K_{j,k}$ is encrypted either directly or indirectly using $S_i$ prior to being stored;
    wherein decrypting the secrets to be remembered involves decrypting secrets to be remembered within a target subset containing the secret to be forgotten, which involves using $S_i$ to either directly or indirectly to decrypt a subset key $K_{j,k}$ for the target subset, and then decrypting the secrets to be remembered using $K_{j,k}$; and
    wherein removing the secret to be forgotten from the set of secrets involves removing the secret to be forgotten from the target subset;
    wherein obtaining the new secret key $S_{i+1}$ also involves obtaining a new subset key $K_{j,k+1}$ for the target subset; and
    wherein encrypting the secrets to be remembered involves, encrypting the secrets to be remembered in the target subset using $K_{j,k+1}$, and then using $S_{i+1}$ either directly or indirectly to encrypt $K_{j,k+1}$.

3. The method of claim 2, wherein the subsets of the set of secrets and the corresponding subset keys are stored in a lookup structure, which facilitates looking up the secrets.

4. The method of claim 3,
    wherein the lookup structure is a tree;
    wherein the subsets are stored in corresponding nodes which form the tree; and
    wherein each parent node in the tree contains keys which are used to encrypt associated child nodes in the tree, wherein the secret key $S_i$ is used to encrypt the root node of the tree.

5. The method of claim 4, further comprising retrieving a desired secret by:
    performing a lookup in the tree to obtain a target node containing the desired secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes; and
    using $K_{j,k}$ to decrypt the desired secret contained in the target node.

6. The method of claim 4, further comprising storing a new secret by:
    performing a lookup in the tree to identify a target node in which to store the new secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes;

using $K_{j,k}$ to encrypt the new secret; and inserting the encrypted new secret into the subset of secrets contained in the target node.

7. The method of claim 1, wherein the set of secrets is maintained on a general-purpose computer which communicates with a smart card;

wherein the encryption and decryption operations are performed on the smart card; and wherein all secret keys, including the secret key $S_i$ and the new secret key $S_{i+1}$, are stored only on the smart card and never leave the smart card.

8. A computer-readable storage medium storing instructions that when executed by a computer cause the computer to perform a method for securely forgetting a secret, the method comprising:

obtaining a set of secrets which are encrypted with a secret key $S_i$, wherein the set of secrets includes a secret to be forgotten and other secrets which are to be remembered, wherein each secret comprises a unique key that is used to encrypt and decrypt one or more associated files;

decrypting the secrets to be remembered using $S_i$, wherein decrypting the secrets includes using Si to decrypt all of the secrets;

removing the secret to be forgotten from the set of secrets;

obtaining a new secret key $S_{i+1}$;

encrypting the secrets to be remembered using $S_{i+1}$; and forgetting $S_i$, wherein forgetting $S_i$ involves making all copies of the secret to be forgotten permanently unretrievable.

9. The computer-readable storage medium of claim 8, wherein the set of secrets is divided into subsets which are encrypted with different subset keys;

wherein each subset key $K_{j,k}$ is encrypted either directly or indirectly using $S_i$ prior to being stored;

wherein decrypting the secrets to be remembered involves decrypting secrets to be remembered within a target subset containing the secret to be forgotten, which involves using $S_i$ to either directly or indirectly to decrypt a subset key $K_{j,k}$ for the target subset, and then decrypting the secrets to be remembered using $K_{j,k}$; and wherein removing the secret to be forgotten from the set of secrets involves removing the secret to be forgotten from the target subset;

wherein obtaining the new secret key $S_{i+1}$ also involves obtaining a new subset key $K_{j,k+1}$ for the target subset; and wherein encrypting the secrets to be remembered involves, encrypting the secrets to be remembered in the target subset using $K_{j,k+1}$, and then using $S_{i+1}$ either directly or indirectly to encrypt $K_{j,k+1}$.

10. The computer-readable storage medium of claim 9, wherein the subsets of the set of secrets and the corresponding subset keys are stored in a lookup structure, which facilitates looking up the secrets.

11. The computer-readable storage medium of claim 10, wherein the lookup structure is a tree;

wherein the subsets are stored in corresponding nodes which form the tree; and wherein each parent node in the tree contains keys which are used to encrypt associated child nodes in the tree, wherein the secret key $S_i$ is used to encrypt the root node of the tree.

12. The computer-readable storage medium of claim 11, wherein the method further comprises retrieving a desired secret by:

performing a lookup in the tree to obtain a target node containing the desired secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes; and using $K_{j,k}$ to decrypt the desired secret contained in the target node.

13. The computer-readable storage medium of claim 11, wherein the method further comprises storing a new secret by:

performing a lookup in the tree to identify a target node in which to store the new secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes;

using $K_{j,k}$ to encrypt the new secret; and inserting the encrypted new secret into the subset of secrets contained in the target node.

14. The method of claim 1, wherein obtaining the new key $S_{i+1}$ includes computing key $S_{i+1}$ using a one-way hash function h for which Si is an input.

15. An apparatus for securely forgetting a secret, comprising:

a receiving mechanism configured to receive a set of secrets which are encrypted with a secret key $S_i$, wherein the set of secrets includes a secret to be forgotten and other secrets which are to be remembered, wherein each secret comprises a unique key that is used to encrypt and decrypt one or more associated files;

a decryption mechanism configured to decrypt the secrets to be remembered using $S_i$, wherein decrypting the secrets includes using Si to decrypt all of the secrets;

a removal mechanism configured to remove the secret to be forgotten from the set of secrets;

a key-obtaining mechanism configured to obtain a new secret key $S_{i+1}$;

an encryption mechanism configured to encrypt the secrets to be remembered using $S_{i+1}$; and a deletion mechanism configured to forget $S_i$, wherein forgetting $S_i$ involves making all copies of the secret to be forgotten permanently unretrievable.

16. The apparatus of claim 15, wherein the set of secrets is divided into subsets which are encrypted with different subset keys;

wherein each subset key $K_{j,k}$ is encrypted either directly or indirectly using $S_i$ prior to being stored;

wherein while decrypting the secrets to be remembered, the decryption mechanism is configured to decrypt secrets to be remembered within a target subset containing the secret to be forgotten, which involves using $S_i$ to either directly or indirectly to decrypt a subset key $K_{j,k}$ for the target subset, and then decrypting the secrets to be remembered using $K_{j,k}$; and wherein the removal mechanism is configured to remove the secret to be forgotten from the target subset;

wherein while obtaining the new secret key $S_{i+1}$, the key-obtaining mechanism is configured to obtain a new subset key $K_{j,k+1}$ for the target subset; and wherein while encrypting the secrets to be remembered, the encryption mechanism is configured to encrypt the secrets to be remembered in the target subset using $K_{j,k+1}$, and to then use $S_{i+1}$ either directly or indirectly to encrypt $K_{j,k+1}$.

17. The apparatus of claim 16, further comprising a lookup structure, which stores the subsets of the set of secrets and the corresponding subset keys, wherein the lookup structure facilitates looking up the secrets.

18. The apparatus of claim 17, wherein the lookup structure is a tree;

wherein the subsets are stored in corresponding nodes which form the tree; and wherein each parent node in the tree contains keys which are used to encrypt associated child nodes in the tree, wherein the secret key $S_i$ is used to encrypt the root node of the tree.

19. The apparatus of claim 18, further comprising a retrieval mechanism configured to retrieve a desired secret by:

performing a lookup in the tree to obtain a target node containing the desired secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes; and using $K_{j,k}$ to decrypt the desired secret contained in the target node.

20. The apparatus of claim 18, further comprising a storage mechanism configured to store a new secret by:

performing a lookup in the tree to identify a target node in which to store the new secret, and also to obtain a corresponding key $K_{j,k}$ for the target node, wherein the lookup involves using $S_i$ to decrypt the root node of the tree, and thereafter using keys contained in parent nodes to decrypt child nodes as the lookup progresses from the parent nodes to the child nodes;

using $K_{j,k}$ to encrypt the new secret; and inserting the encrypted new secret into the subset of secrets contained in the target node.

21. The apparatus of claim 16, wherein the set of secrets is maintained on a general-purpose computer which communicates with a smart card;

wherein the encryption and decryption operations are performed on the smart card; and wherein all secret keys, including the secret key $S_i$ and the new secret key $S_{i+1}$, are stored only on the smart card and never leave the smart card.

* * * * *